(12) United States Patent
Voorhees (10) Patent No.: US 12,383,058 B2
(45) Date of Patent: Aug. 12, 2025

(54) LOAD-BEARING FURNITURE FROM FOLDED MATERIAL

(71) Applicant: Michael Voorhees, Albuquerque, NM (US)

(72) Inventor: Michael Voorhees, Albuquerque, NM (US)

( * ) Notice: Subject to any disclaimer, the term of this patent is extended or adjusted under 35 U.S.C. 154(b) by 77 days.

(21) Appl. No.: 18/572,169

(22) PCT Filed: Jun. 18, 2022

(86) PCT No.: PCT/IB2022/055674
§ 371 (c)(1),
(2) Date: Dec. 19, 2023

(87) PCT Pub. No.: WO2022/269443
PCT Pub. Date: Dec. 29, 2022

(65) Prior Publication Data
US 2024/0285071 A1    Aug. 29, 2024

Related U.S. Application Data (60) Provisional application No. 63/202,702, filed on Jun. 21, 2021.

(51) Int. Cl.
*A47B 47/00* (2006.01)
*A47B 47/04* (2006.01)

(52) U.S. Cl.
CPC .... *A47B 47/042* (2013.01); *A47B 2230/0085* (2013.01)

(58) Field of Classification Search
CPC ............. A47B 47/042; A47B 47/06; A47B 2230/0085; A47B 2230/0081; A47B 2220/0083; A47B 13/003; A47B 13/088; A47B 3/00; A47C 19/005; A47C 19/025; A47C 4/021; A47C 5/005; F16B 12/125
USPC ............. 108/60, 51.3, 115; 312/259, 262; 297/440.12, 440.13
See application file for complete search history.

(56) References Cited

U.S. PATENT DOCUMENTS

| | | | |
|---|---|---|---|
| 3,212,464 A * | 10/1965 | Steuer | A47C 5/005 108/150 |
| 5,836,254 A * | 11/1998 | Johansson | B65D 19/0026 108/51.3 |
| 10,463,146 B1 * | 11/2019 | Bravo | A47B 3/06 |
| 2013/0080286 A1 * | 3/2013 | Rotholz | B26D 3/00 493/379 |

(Continued)

FOREIGN PATENT DOCUMENTS

| | | | |
|---|---|---|---|
| CA | 3167901 A1 * | 1/2024 | |
| CN | 106859051 A * | 6/2017 | |
| DE | 3932773 A1 * | 3/1990 | |

(Continued)

OTHER PUBLICATIONS

English translation CN106859051 (Year: 2017).*

*Primary Examiner* — Janet M Wilkens (57) ABSTRACT

Load-bearing furniture (such as beds, tables, desks, benches, and the like) made from lightweight, foldable material, comprised of base supports with beveled crenellations along certain top edges of the supports, designed to securely receive beams formed in the shape of flanged triangular prisms, said beams optionally featuring ventilation holes to facilitate air circulation through beam cavities.

11 Claims, 7 Drawing Sheets

(56) References Cited

U.S. PATENT DOCUMENTS

2015/0282609 A1* 10/2015 Rotholz .................. B31D 5/04
248/174

FOREIGN PATENT DOCUMENTS

| SE | 503535 C2 * | 7/1996 |
|----|----|----|
| WO | WO-2023237241 A1 * | 12/2023 |
| WO | WO-2024086865 A1 * | 5/2024 |

* cited by examiner

LOAD-BEARING FURNITURE FROM FOLDED MATERIAL

TECHNICAL FIELD

This invention relates to items of load-bearing furniture—and beds in particular—which are fabricated from foldable material such as corrugated containerboard.

BACKGROUND ART

Humans have been creating structures for sleeping since at least the Middle Paleolithic period, some 200,000 years ago. Archeological evidence from the KwaZulu-Natal region of South Africa indicates bundles of grass from the broad-leafed Panicoideae subfamily and *Tarchonanthus camphoratus* (camphor bush) leaves were placed upon mixtures of ash to create a more comfortable sleeping surface that also provided protection from parasites by inhibiting the movement of ticks and other arthropod irritants (Science 14 Aug. 2020: Vol. 369, Issue 6505, pp. 863-866 DOI: 10.1126/science.abc7239). Skara Brae, a Neolithic settlement in the Orkney Islands dating to 3180 BCE, contains the ruins of dwellings with beds of made of stone used to contain and protect mattresses of straw or heather. (Darvill, Timothy C., 1987, *Prehistoric Britain*. London: Yale University Press. ISBN 0-300-03951-4). Contemporaneous with Skara Brae, the Ancient Egyptians were already practicing complex carpentry, and constructing elevated framed beds from wood and other materials, as depicted on illustrated tomb walls, described in hieroglyphic texts, and evident from extant artifacts. However, due to a lack of suitable local wood, elaborate and extensive trading networks with the Phoenicians were necessary to meet the demand for cedar and fir, from which these beds were fabricated.

In China, During the Ming Dynasty (1368-1644CE), the shelf bed (架子床) became common in upper echelons of society. Similar to the Western four-poster bed, the basic form was a rectangular platform raised on four legs at the corners. It often featured elaborate latticework and an upper frame that allowed for curtains to protect the occupants from mosquitos while sleeping. By the 1500s, four-poster beds became widely used by nobility throughout Europe, and were often a status symbol featuring ornately carved posts at each of the four corners, enclosed by a rectangular panel at the top and curtains around the sides. While the shelf bed in China provided a solid support for a mattress, the western versions often used a web of rope, leather, or metal springs to provide support.

By the early to mid 20th century, minimalist styles of furniture gained in popularity. With the advent of Scandinavian platform beds, posts and canopies (and often boxsprings) were eliminated, and only the minimal components of a rectangular platform to support a mattress and the means for keeping it raised off of the floor remained. Such beds ranged from expensive artisanally crafted wood with subtle lines to more affordable industrially produced components made from plywood or metal. But even the humblest of these represents a financial burden to many.

In 1963, Steuer disclosed (in U.S. Pat. No. 3,212,464) a novel design for furniture made from inexpensive foldable material suitable for lightweight applications such as tables and benches. While superficially similar to some aspects of the present invention, Steuer's invention had two significant limitations that would make it impractical as the basis for a platform bed (and indeed there is no suggestion in that patent of adapting the elements of the design to form a bed). These limitations include openings in the (under)sides of the top panel designed "to receive and pass therethrough" the support panels, which significantly undermine the load bearing potential of the beam, and the way in which the support panels extend up through to the underside of the top surface of the beam restricts the potential for sufficient ventilation through the horizontal beam cavity. Similarly, a half century later, Rotholz disclosed various minor modifications to the Steuer approach (U.S. Pat. Nos. 9,585,482; 9,701,090; 9,701,090; and 10,578,142) but in all variations includes similar weakening penetrations to the undersides of the prismatic beam into which the top surface of his desks and tables is incorporated. Many of the Rotholz designs are claimed to optimize for the use of stronger, more expensive, triple-wall corrugated board, to make up for the weakness of single or double-wall corrugate, but it will be apparent that the present invention overcomes such prior art design weaknesses without need for more expensive materials, and beds of the present invention manufactured out of double-wall EB fluting have supported loads tested to an excess of 5460 kilograms under an hydraulic press.

SUMMARY OF INVENTION

Technical Problem

The present invention is a means of constructing a type of load-bearing furniture—such as a platform bed, table, desk, etc. . . . —that carries its load through the use of lightweight, foldable, and typically inexpensive materials, without the use of fasteners or tools for assembly. And in regards to beds—which must quietly withstand both continuous static loads of the mattress, and the intermittent static and dynamic loads of the occupant(s) for a period of years—the design must be especially resilient.

Solution to Problem

The load-bearing furniture is comprised of two major types of structural components. First, base supports having upper edges, a portion of which include a series of beveled crenellations that accommodate the insertion of one or more beams. Second, one or more hollow beams; each made from a planar panel divided into at least five sections along four score lines. By folding the panel along these lines, using two concave folds and two convex folds, the beam forms a flanged triangular prism, whereby the surfaces of their interior faces are in contact with one another and nearly coplanar. The beams are laid across the crenelated base supports such that the triangular cross sections nest between the bevels, and the flanges are received by the slot formed between the bases of the crenellations. In this manner, the folds running lengthwise to the beams provide added stiffness to the planar material, and the load is carried to and distributed along the crenellated edges of the supports to the floor. By including optional notches in the edge of the beam flanges, horizontal displacement is restricted for both the beams and the supports. When using anisotropic materials such as corrugated fiberboard, the fluting of both the supports and the beams should ideally be oriented perpendicular to the length of the beams.

Advantageous Effects of Invention

The invention allows beds and other furniture to be sustainably manufactured on an industrial scale with a low carbon footprint, using 100% recycled content corrugated container board. These same items are also 100% recyclable, further reducing their environmental impact. Able to be shipped flat, these items are lightweight, reducing transportation costs and its associated carbon footprint, and facilitates easy carriage, manipulation, and assembly by one individual. Because no fasteners are used, no tools are needed, and assembly may be accomplished quickly. By optionally incorporating ventilation holes in the bed version of the invention, air may freely circulate across the entire width of the bed and thus reduce the buildup of moisture, thereby prolonging the useful life of mattresses supported by the bed.

DESCRIPTION OF EMBODIMENTS

This invention is a means of constructing a type of load-bearing furniture through the use of lightweight, foldable, and typically inexpensive materials.

Examples

Figure 1:
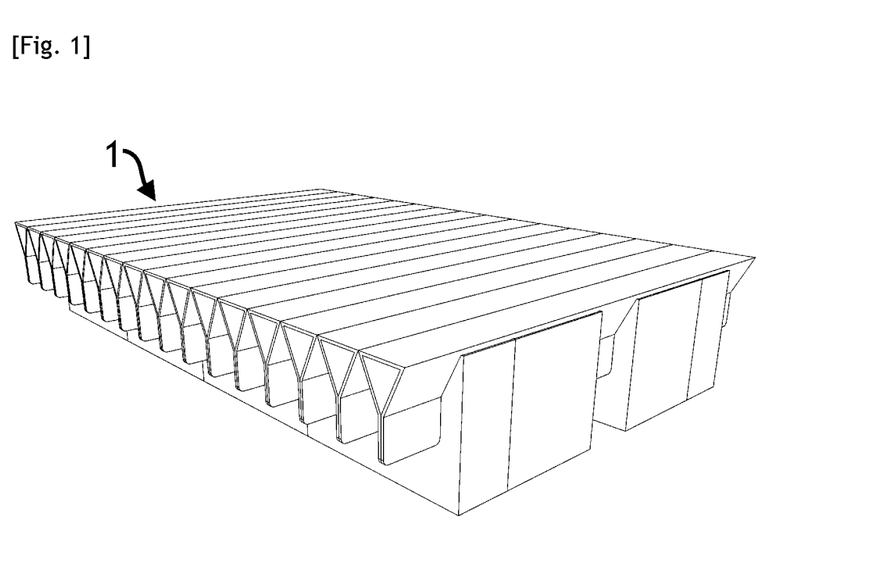
FIG. 1 is a whole perspective drawing illustrating a preferred embodiment of the load-bearing furniture in the form of an assembled platform bed 1.
Figure 2:
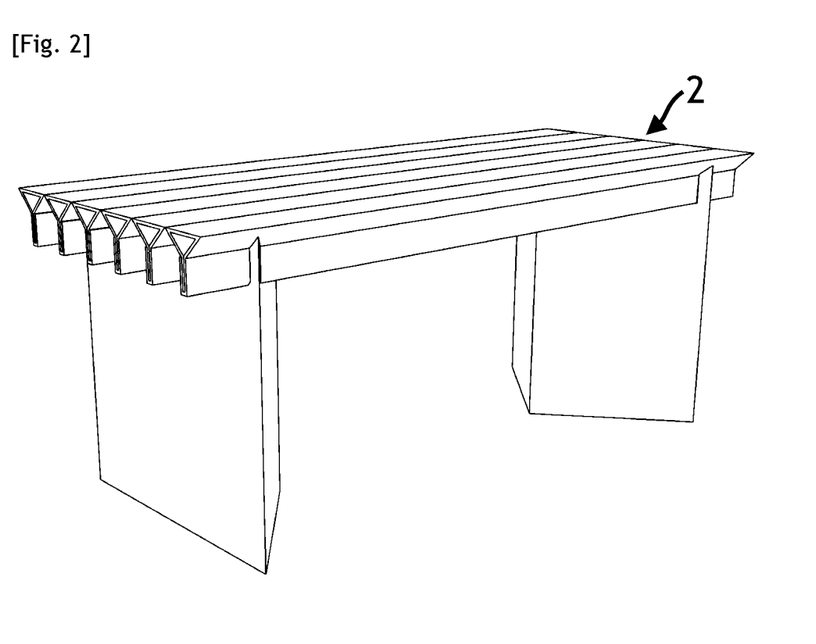
FIG. 2 is a whole perspective drawing illustrating a preferred embodiment of the load-bearing furniture in the form of an assembled table 2.

Referencing [FIG. 1], a preferred embodiment in the form of an assembled platform bed 1 is shown fully assembled. [FIG. 2] shows another preferred embodiment in the form of a fully assembled table.

Figure 3:
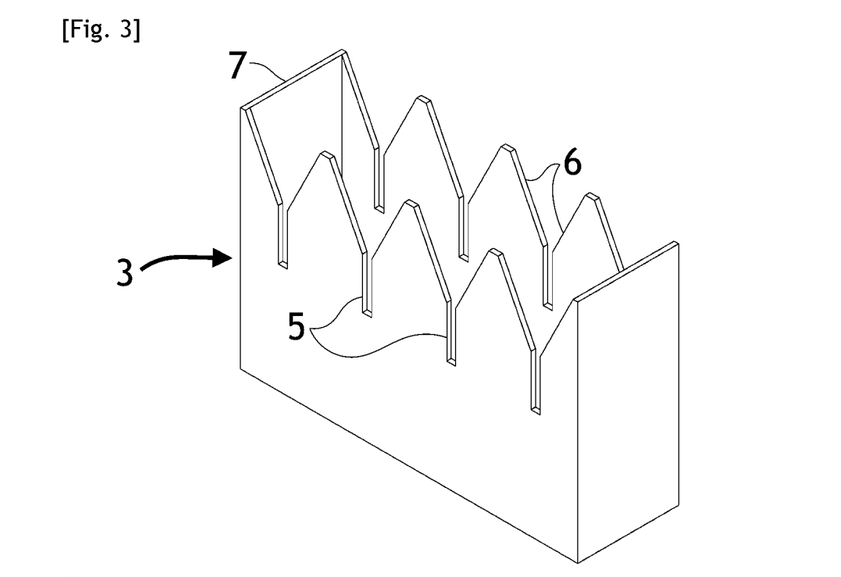
FIG. 3 is a detailed isometric view of a first configuration of one of the base supports 3 of the assembled platform bed 1.
Figure 4:
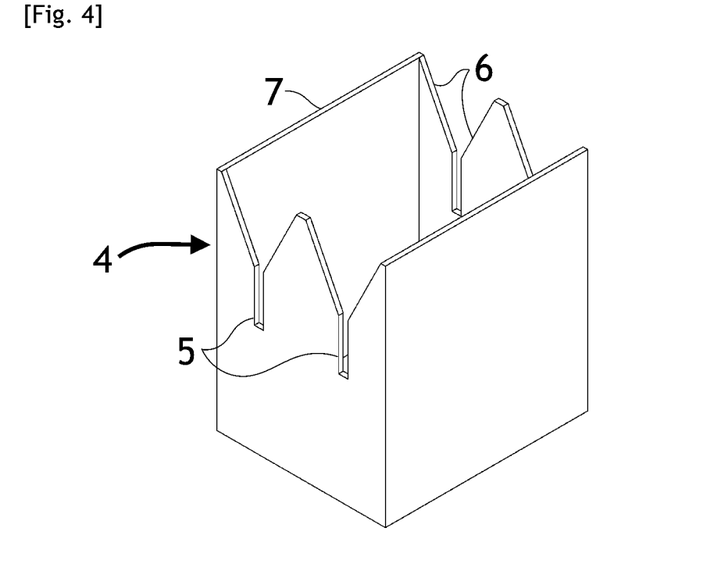
FIG. 4 is a detailed isometric view of a second configuration of one of the base supports 4 of the assembled platform bed 1.
Figure 5A:
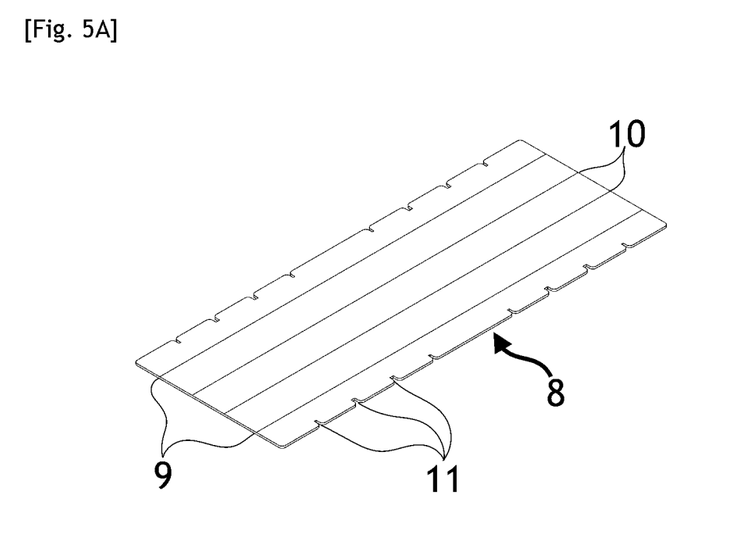
FIG. 5A is a detailed isometric view illustrating the unfolded state of a beam 8 of the assembled platform bed 1.
Figure 5B:
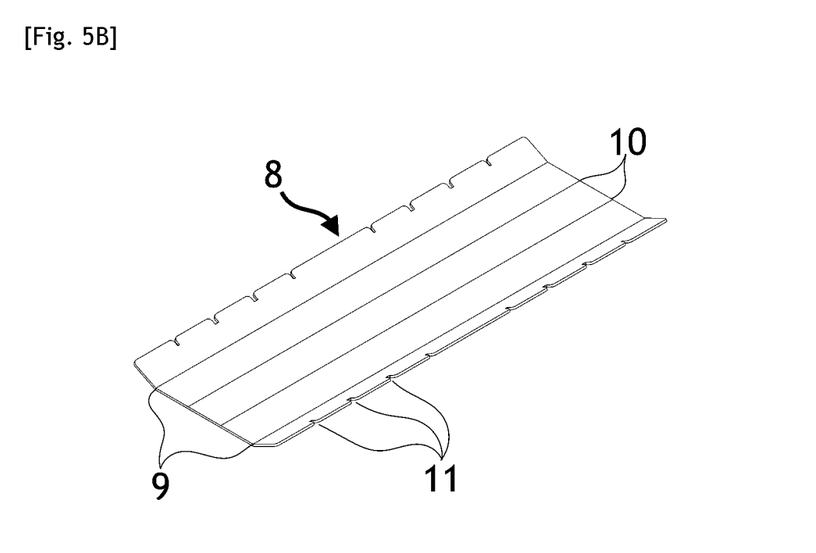
FIG. 5B is a detailed isometric view illustrating a transitional state of a partially-folded beam 8 of the assembled platform bed 1.
Figure 5C:
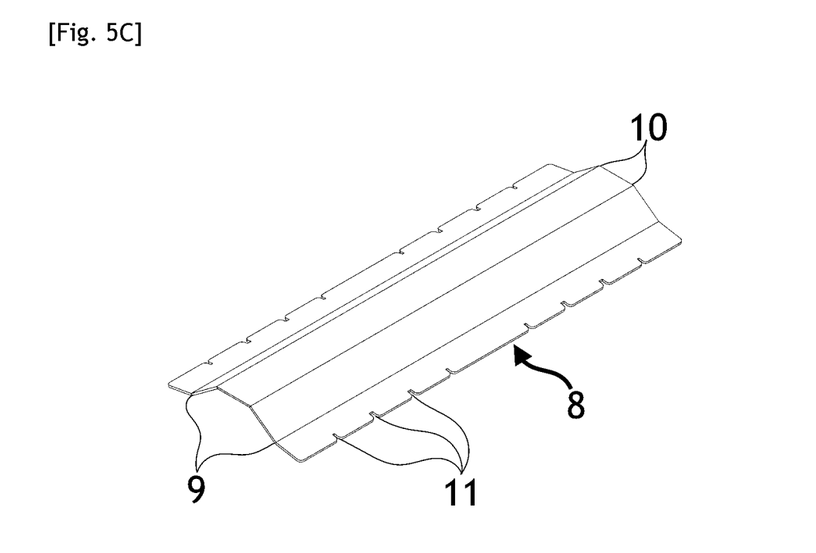
FIG. 5C a detailed isometric view illustrating a further transitional state of a partially-folded beam 6 of the assembled platform bed 1.
Figure 5D:
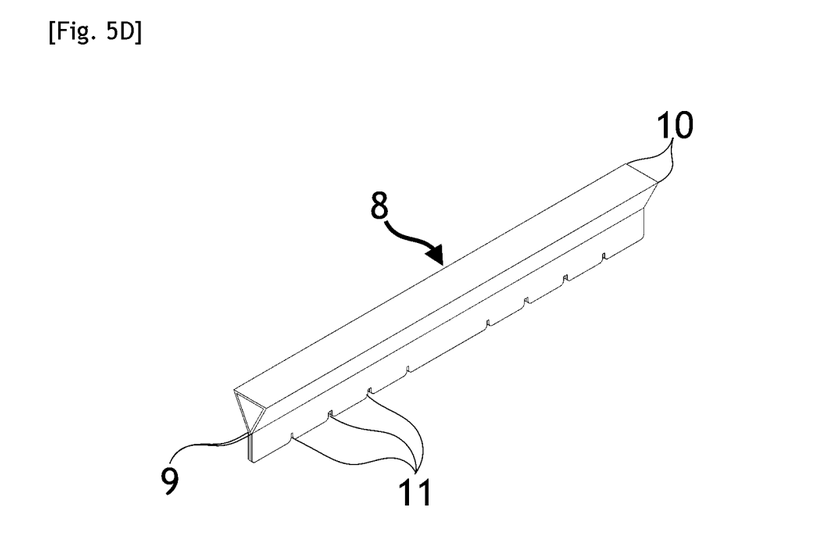
FIG. 5D a detailed isometric view illustrating a fully-folded beam 6 of the assembled platform bed 1.
Figure 6:
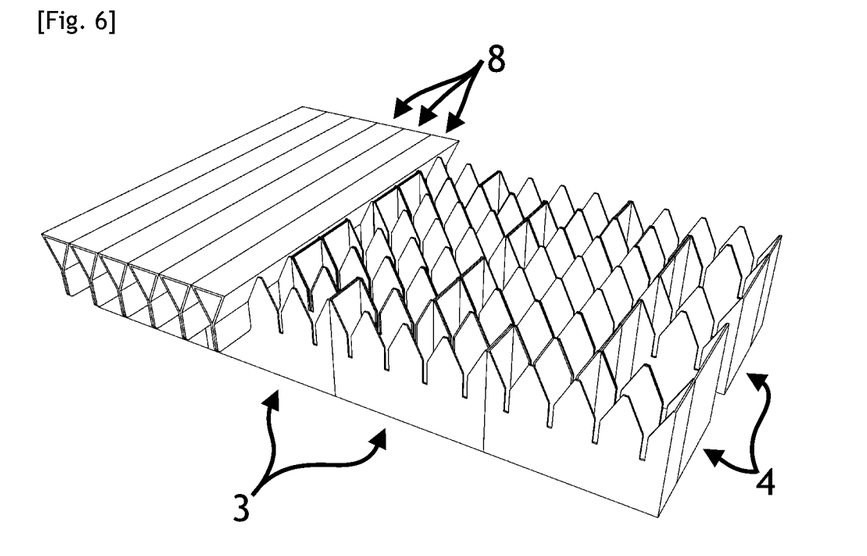
FIG. 6 is a perspective drawing illustrating a partially assembled platform bed 1 with seven of sixteen beams 8 placed into their respective base supports 3 & 4.

As [FIG. 3] & [FIG. 4] show in isometric views, base supports 3 & 4 of the platform bed 1 each have different numbers of crenellations 5 with corresponding bevels 6, as well as non-crenellated edges 7 running parallel to the assembled beams 8 (which are shown in FIG. 6). [FIG. 5A] through [FIG. 5D] show isometric views of the substantially planar foldable material that comprises each of the beams 8, in progressive stages of being folded into it's completed form. [FIG. 5A] shows the material that will comprise the beam with scoring lines 9 & 10 running lengthwise across the material, and shows several optional notches 11, cut into the unfolded beam 8. [FIG. 5B] shows the material being folded in a concave manner relative to the isometric view along both outer scoring lines 9, with the portions of the beam that will form the flanges now raised at angle relative to the rest of the material. [FIG. 5C] shows the material being further folded, this time in a convex manner relative to the isometric view along both inner scoring lines 10. [FIG. 5D] shows the angles of the folds along both inner scoring lines 10 being increased until the inner faces of the flange portions of beam 8 come in contact with one another and are then nearly coplanar, completing the extent of folding. [FIG. 6] shows a perspective view of a partially assembled platform bed (as in 1 of [FIG. 1] above), with a number of supports 3 & 4 arranged side by side in two groups, such that the beveled crenellations form voids capable of securely receiving the fully folded and formed beams 8. In the case of [FIG. 6], seven of sixteen beams 8 necessary to complete this embodiment of a platform bed (as in 1 of [FIG. 1] above) are shown inserted into and between the crenellations 5 and their respective bevels 6, and with the notches 11 on the beams 8 corresponding to the bottom edges of the crenellations 5. It may be noted that the placement of the supports is deliberately staggered in different rows, so that the load-bearing surface created by the adjacent beams 8 cannot be separated along the boundaries of the supports 3 & 4 under normal use.

Figure 7:
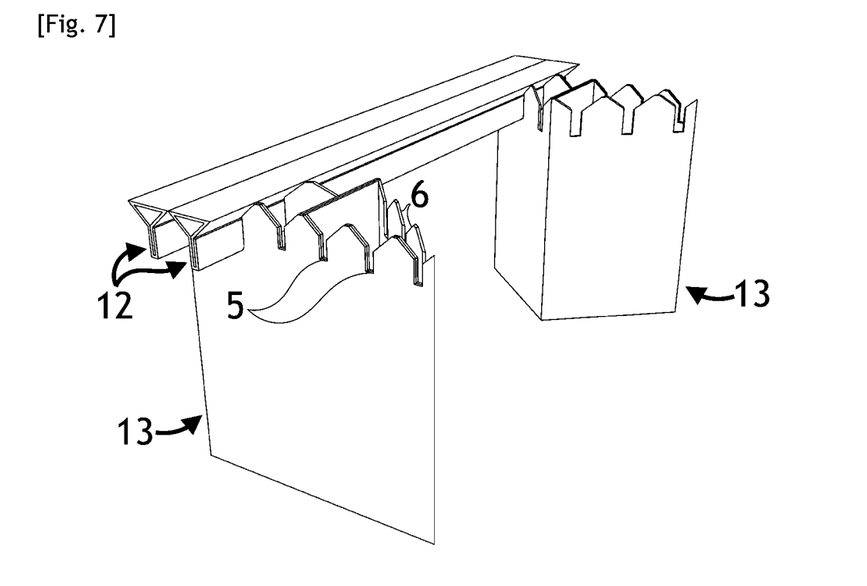
FIG. 7 is a perspective drawing illustrating a partially assembled table 2 with two of six beams 12 placed into their respective positions on the base supports 13.

Referencing [FIG. 7], we see a similar depiction of a perspective view of a partially assembled table (as in 2 of [FIG. 2] above) with two supports 13 arranged opposite one another, such that the beveled crenellations form voids capable of securely receiving the fully folded and formed beams 12. As can be seen, the supports 13 need not be rectilinear, and are in this embodiment in the form of a vertical triangular column with interior brace, with each support 13 made from a single piece folded along six parallel scores, allowing the outboard edges to be reenforced with double thickness. In the case of [FIG. 7], two of six beams 12 necessary to complete this embodiment of a table (as in 2 of [FIG. 2] above) are shown inserted into and between the crenellations 5 and their respective bevels 6. Of note is that the angles of the bevels and depth of the crenellations may be different for different kinds of furniture to accommodate and balance the relative needs of loads vs. clearance. In the case of the table or desk, in which space to accommodate the user's legs is necessary, the triangular void in the prismatic beam may be more obtuse to facilitate greater clearance. Also of note, to eliminate a rough or sharp edge from contacting the legs of users seated at a table or desk of the present invention, one side of the flange may be longer than the other, allowing for it to be folded across and back up, so as to present a relatively smooth, finished surface on the underside of the beams, as illustrated in the beams 12 in [FIG. 7]. The crenellations and bevels could also be arranged to achieve a sloped or curved combined surface of the beams on other embodiments of the present invention.

Figure 8:
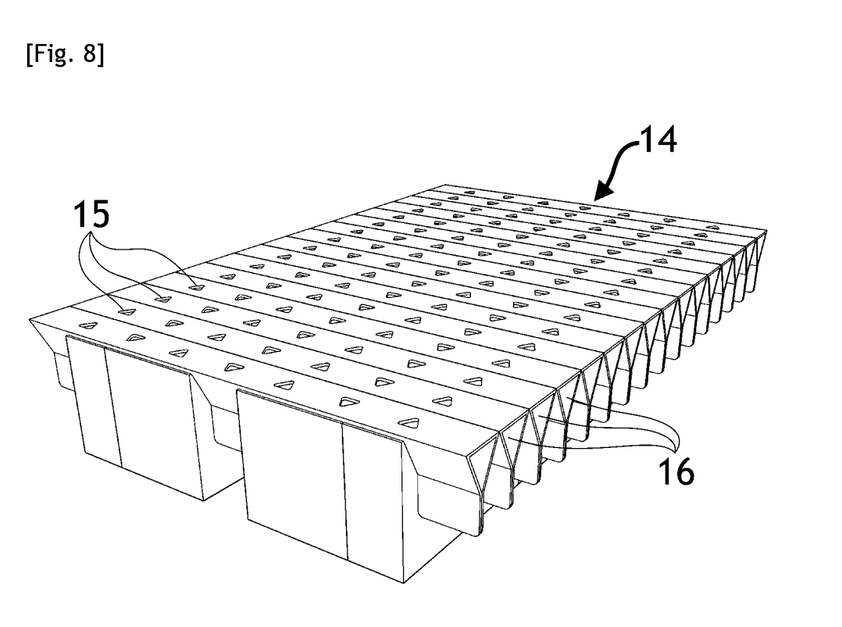
FIG. 8 is a whole perspective drawing illustrating a preferred embodiment of the load-bearing furniture in the form of an assembled platform bed 14 featuring optional ventilation holes 15.

[FIG. 8] shows a preferred embodiment in the form of an assembled platform bed 14 (as in 1 of [FIG. 1] above), however in this embodiment, the inclusion of optional ventilation holes 15 are shown along the top surfaces of the assembled beams to prevent an accumulation of moisture and humidity on the undersurface of any prior art mattress supported by the platform bed. By providing access to the beam cavities 16, the ventilation holes 15 provide a pathway for drier ambient air to circulate and reduce the humidity along the mattress base.

Figure 9A:
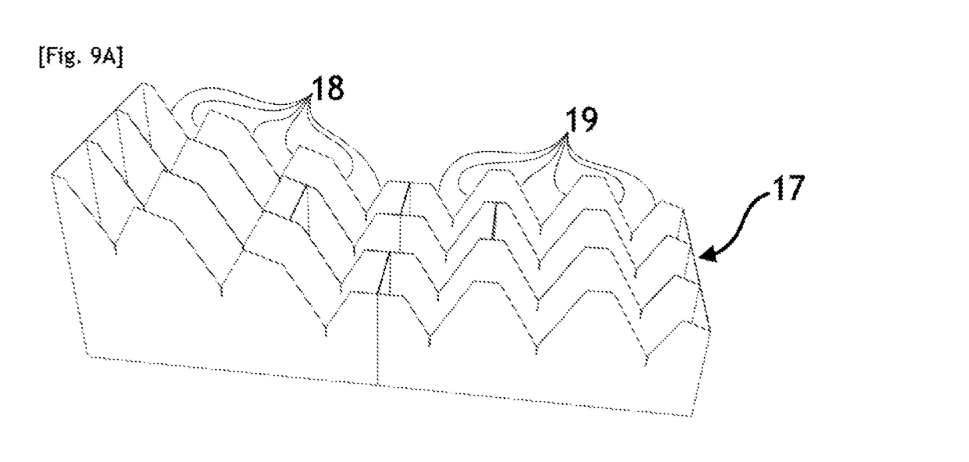
FIG. 9A is a perspective drawing illustrating a partially assembled platform bed 17 featuring means for the base supports to facilitate a bed with both inclined and curved surface profiles.

[FIG. 9A] shows a a perspective drawing illustrating a partially assembled platform bed 17 wherein adjacent bevelled crenellations of the base supports 18 form an inclined sequence on one half of the bed 17 and adjacent bevelled crenellations of the base supports 19 are varied in height and angles which form an overall curved profile on the other half of the bed 17.

Figure 9B:
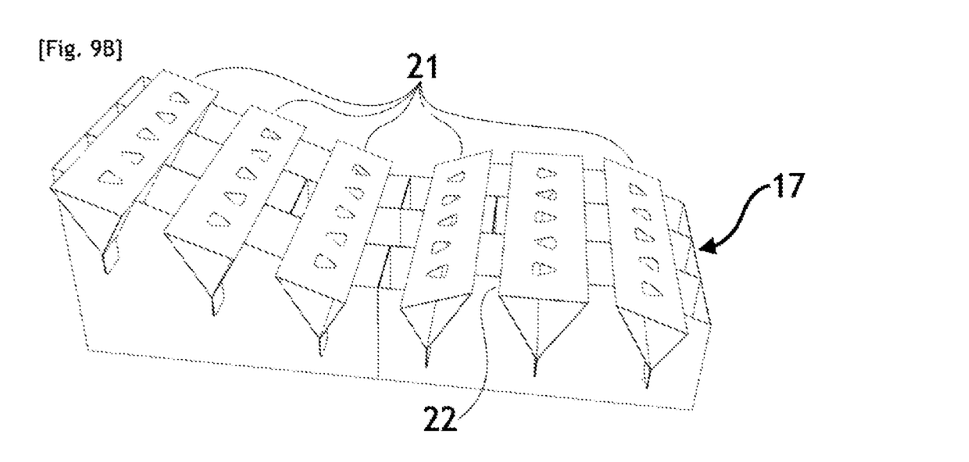
FIG. 9B is a perspective drawing illustrating a fully assembled platform bed 17 featuring beams that form a bed with both inclined and curved surface profiles.

[FIG. 9B] shows a perspective drawing illustrating a fully assembled platform bed 17 comprised of beams with an inclined top surface 21 and a beam with a level top surface 22, wherein the three adjacent beams 21 (oriented with a downward slope from left to right) on the left of the figure collectively form an inclined surface on one half of the bed 17 and the three adjacent beams 21 (oriented with an upward slope from left to right), 22, and 21 (oriented with a downward slope from left to right) on the other half of the bed 17 form an overall curved profile.

CITATION LIST

Patent Literature

U.S. Pat. No. 3,121,464 (STEUER, NF) Oct. 19, 1965.
U.S. Pat. No. 9,585,482 (ROTHOLZ, Z) Mar. 7, 2017.
U.S. Pat. No. 9,701,090 (ROTHOLZ, Z) Jul. 11, 2017.
U.S. Pat. No. 9,975,307 (ROTHOLZ, Z) May 22, 2018.
U.S. Ser. No. 10/578,142 (ROTHOLZ, Z) Mar. 3, 2020.

Non Patent Literature (Science 14 Aug. 2020: Vol. 369, Issue 6505, pp. 863-866 DOI: 10.1126/science.abc7239).
(DARVILL, TIMOTHY C., 1987, *Prehistoric Britain*. London: Yale University Press. ISBN 0-300-03951-4).

The invention claimed is:

1. An item of load-bearing furniture made from foldable materials comprised of: one or more base supports with bevelled crenellations projecting upwards along at least two upper edges; one or more hollow beams in the form of a triangular prism with a flange projecting outward from one corner of each beam, each made from a planar panel divided into at least five sections along four score lines, with the flange comprised of a minimum of two sections of the panel whereby the surfaces of their interior faces are in contact with one another and nearly coplanar; the arrangement of said beam(s) such that they are laid across the crenelated supports with their triangular cross sections nesting between the bevels, the bevels supporting loads on the beam(s), and the flanges being received by slots formed between the cancellations.

2. An item of load-bearing furniture of claim 1 wherein the item is a platform bed.

3. An item of load-bearing furniture of claim 2 whereby the hollow beams feature ventilation holes for the purpose removing a buildup of water vapor and/or condensation from the underside of any mattress of which the platform bed is supporting.

4. An item of load-bearing furniture of claim 1 wherein the item is a table.

5. An item of load-bearing furniture of claim 1 wherein the item is a desk.

6. An item of load-bearing furniture of claim 1 wherein the item is a bench.

7. An item of load-bearing furniture of claim 1 with two or more hollow beams, wherein adjacent bevelled crenellations of the base support(s) form an inclined sequence and the corresponding top surfaces of the beams collectively form an inclined surface.

8. An item of load-bearing furniture of claim 1 with two or more hollow beams, wherein adjacent bevelled crenellations of the base support(s) are varied in height and angles such that the corresponding top surfaces of the beams collectively form a segmented surface with an overall curved profile.

9. An item of load-bearing furniture of claim 1 wherein the ends of the base supports, located opposite of the bevelled crenellations, form a closed bottom.

10. An item of load-bearing furniture of claim 1 wherein the item is made from corrugated containerboard.

11. An item of load-bearing furniture of claim 1 wherein notches along outer edges of the flanges projecting outward from the beams, that when assembled allow portions of the flanges to extend beyond the crenellations, thereby restricting the lateral displacement of both the crenellated base supports and the beams.

* * * * *

UNITED STATES PATENT AND TRADEMARK OFFICE
CERTIFICATE OF CORRECTION

PATENT NO. : 12,383,058 B2
APPLICATION NO. : 18/572169
DATED : August 12, 2025
INVENTOR(S) : Michael Voorhees

Page 1 of 1

It is certified that error appears in the above-identified patent and that said Letters Patent is hereby corrected as shown below:

In the Claims

In Column 6 Line 12, Claim 1, the word "cancellations" should read "crenellations".

Signed and Sealed this
Sixteenth Day of September, 2025

Coke Morgan Stewart
*Acting Director of the United States Patent and Trademark Office*